(No Model.)
A. BERNSTEIN.
MANUFACTURE OF INCANDESCENT ELECTRIC LAMP FILAMENTS.
No. 369,091. Patented Aug. 30, 1887.
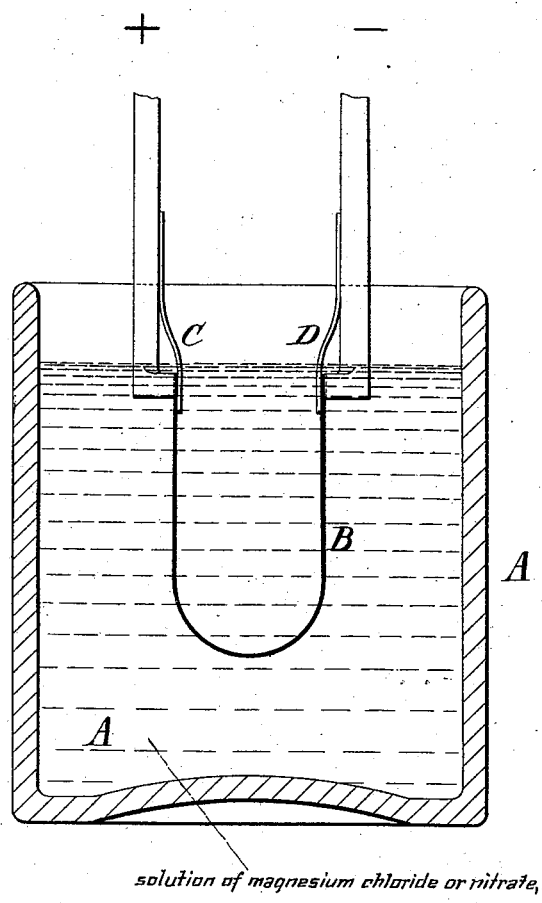
solution of magnesium chloride or nitrate, in alcohol
Witnesses.
Inventor.

UNITED STATES PATENT OFFICE.

ALEXANDER BERNSTEIN, OF LONDON, ENGLAND.

MANUFACTURE OF INCANDESCENT ELECTRIC-LAMP FILAMENTS.

SPECIFICATION forming part of Letters Patent No. 369,091, dated August 30, 1887.

Application filed August 3, 1886. Serial No. 209,880. (No model.)

*To all whom it may concern:*

Be it known that I, ALEXANDER BERNSTEIN, a subject of the Emperor of Germany, residing at London, England, have invented new and useful Improvements in the Manufacture of Incandescent Electric-Lamp Filaments, of which the following is a specification.

The object of my invention is the production of an incandescent electric lamp in which the light-giving substance is of such a nature that the amount of light radiated at a given temperature bears a favorable proportion to the amount of heat produced, thereby producing a very economical lamp. I have found that this proportion varies with different substances, and that the infusible oxides of certain metals are superior to carbon in this respect. Such oxides are those of calcium, magnesium, zirconium, and others belonging to the same class of metals. I shall select magnesium as the representative of this class of metals, and I shall only speak of magnesia in the specification and claim, thereby implying that any of the other metals which give infusible oxides may be used in its place. As the oxides are non-conductors of electricity, they cannot be heated directly by means of the electric current, and I make use of carbon as the means of producing the heat. This carbon is covered with a thin film of magnesia, which assumes the temperature of the carbon and thereby emits light.

My invention consists in the peculiar method by which this deposit is produced in such a manner as to adhere firmly to the carbon, a strong adhesion being necessary in order to prevent the dissipating effect of the heat. For this purpose I employ a salt of magnesium—say, for example, magnesium chloride or magnesium nitrate—and I dissolve the same in a non-conducting liquid, such as alcohol. Into this solution I dip the carbon which is to be coated, and I allow an electric current to pass through the carbon, so as to raise it to a high temperature. In this case the magnesium salt—for example, magnesium chloride—and the alcohol are decomposed, the alcohol losing a part of its oxygen, which combines with the magnesium. The chlorine combines with hydrogen and forms hydrochloric acid, which remains in solution. The carbon is afterward gradually dried in a suitable oven, when the surface will appear to be covered with a white deposit of magnesia, which firmly adheres to the carbon.

For the better illustration of my new method, I add the annexed drawing, in which A is a vessel containing the solution of the metal salt; B, the carbon conductor, which is held by the clips C and D. These clips are the conductors of an electric current sufficiently strong to raise the carbon to incandescence.

Although every kind of carbon, or, in fact, any conductor of electricity, can be covered with a coating of magnesia in this way, I have found that the carbon made of braided threads is best adapted for the purpose, as large pieces of magnesia are retained in the pores between the braids.

I do not claim, broadly, a flexible carbon filament coated with an infusible oxide, nor the method of coating a carbon filament with an infusible oxide, which consists in electrically heating the same in a solution of said oxide in carbonaceous liquid.

Having now particularly described and ascertained the nature of my said invention and the manner of performing the same, I declare that what I claim is—

The described process of coating a carbon with an infusible oxide of metal by immersing the carbon in an alcoholic solution of the salt of the same metal and passing an electric current through the carbon.

ALEXANDER BERNSTEIN.

Witnesses:
G. F. REDFERN,
A. ALBUTT.